United States Patent [19]

Stephens

[11] 3,809,819

[45] May 7, 1974

[54] TDM SWITCHING APPARATUS

[75] Inventor: Raymond A. Stephens, Marion, Iowa

[73] Assignee: Collins Radio Company, Dallas, Tex.

[22] Filed: Dec. 7, 1972

[21] Appl. No.: 313,025

[52] U.S. Cl. ........................ 179/15 AQ, 179/18 GF
[51] Int. Cl. ............................................ H0q 11/04
[58] Field of Search ...... 179/15 AQ, 15 AL, 15 AP, 179/18 J, 15 AT, 15 AS, 18 GF, 15 A

[56] References Cited

UNITED STATES PATENTS 3,735,049 5/1973 Buchner ........................ 179/15 AQ
3,715,505 2/1973 Gordon et al. ................ 179/15 AQ

*Primary Examiner*—Kathleen H. Claffy
*Assistant Examiner*—Joseph A. Popek

[57] ABSTRACT

A non-blocking three-stage switch comprising two stages of multiplexing and a final stage of demultiplexing operations. The multiplexing stages utilize devices contacting a plurality of inputs which inputs are connected to a single output in a controlled order. The demultiplexer stage utilizes this operation in reverse to connect a single input to a plurality of outputs in a controlled order.

2 Claims, 4 Drawing Figures

| CHANNEL | TIME SLOTS 1 | 2 | 3 | 4 | 5 | 6 | 7 | 8 |
|---|---|---|---|---|---|---|---|---|
| $A_1 - A_8$ | O | O | O | O | O | A | O | O |
| $B_1 - B_8$ | | | | | | | | |
| $C_1 - C_8$ | | | | | | | | |
| $D_1 - D_8$ | A | O | O | A | O | A | O | O |

O - OCCUPIED
A - AVAILABLE

TDM SWITCHING APPARATUS

THE INVENTION

The present invention is generally directed toward electronics and more specifically directed toward a means for providing combined multiplexing, demultiplexing, and switching operations.

Prior art attempts at providing switching of TDM (Time Division Multiplexed) channels have involved the utilization of a multiplexer often comprising a plurality of gates operated in a sequential order to generate a TDM frame of information. The switching is then performed separately by means of a memory or register for rearranging the TDM channels in the proper time sequence.

A similar concept is used to distribute a TDM frame of information back to individual channels. The TDM information is assumed to be in the proper time sequence; it is applied to a demultiplexer operating in time sequence order to distribute the TDM frame of information to individual channels.

The present invention eliminates the requirement for performing TDM switching separately from the multiplexing and demultiplexing operation. This is accomplished by controlling the order of multiplexing and demultiplexing to provide combined multiplexing, demultiplexing and switching. Combined multiplexing and switching is accomplished by actuating the multiplexer in the proper time sequence order in which it is desired the information from the lines to appear in the TDM frame.

Combined demultiplexing is performed in a similar fashion. Each incoming time slot is routed to the desired output by means of the proper control applied to the demultiplexer.

It is assumed that the input information is not sensitive to the exact sampling time within the TDM frame or that the input information is held for the frame time. A similar assumption is made for the output information.

As the number of inputs (outputs) to (from) the multiplexer (demultiplexer) are increased the sampling time for each channel becomes shorter. The maximum number of inputs handled becomes limited by the switching speeds of the multiplexer and/or demultiplexer. Additional channels can be accommodated by using a multiplicity of input multiplexers and output demultiplexers with an intermediate level of switching to provide connection between any of the input multiplexers to any output demultiplexer for each time division channel.

The multiplexing, channel switching and demultiplexing operations are similar in result to known time-space-time switching circuits.

It is therefore an object of the present invention to provide improved switching apparatus.

Other objects and advantages of the present invention will be apparent from a reading of the specification and appended claims in conjunction with the drawings wherein;

DETAILED DESCRIPTION

Figure 1:
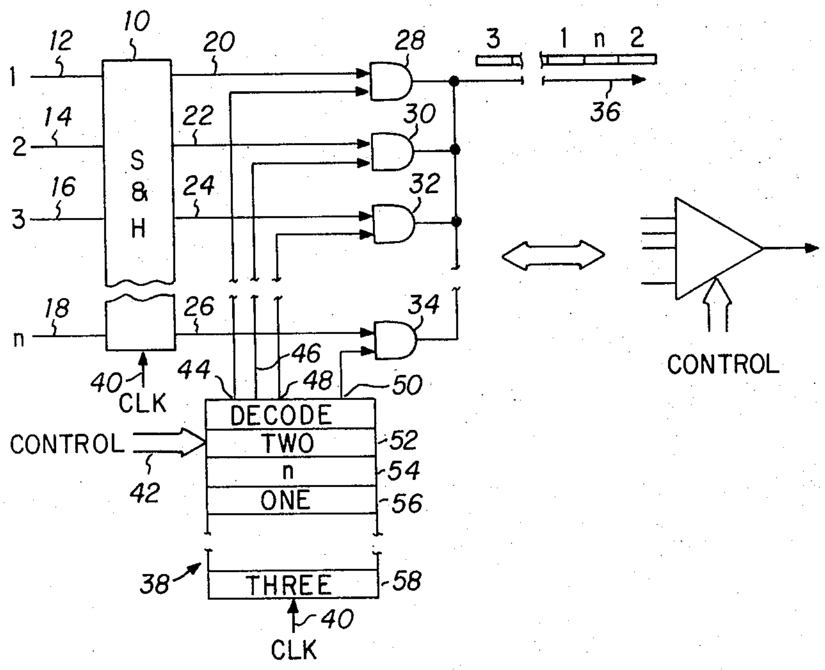
FIG. 1 is a detailed block schematic diagram of a controlled multiplexer.

In FIG. 1 a sample and hold (S&H) block 10 has inputs 12, 14, 16 and 18 further designated as 1, 2, 3 and n respctively. The break in S&H 10 between leads 16 and 18 indicates that a plurality of additional leads may be supplied depending upon usage and limitations of the unit. The sample and hold unit 10 has output leads 20, 22, 24 and 26 corresponding to input leads 12, 14, 16 and 18, respectively. These output leads from sample and hold 10 are applied to a first input of each of AND gates 28, 30, 32 and 34. These AND gates have their outputs supplied to a common output lead 36. A control unit, register, memory unit or decoding unit 38 for performing memory and decoding operations includes an input clock lead 40 and an input control lead 42. Control unit 38 has output leads 44, 46, 48, and 50 connected to the AND gates 28–34, respectively. As will be noted, lines between the AND gates 32 and 34 are broken thereby indicating the possibility of a plurality of additional AND gates. Within the control unit 38 there are memory words 52, 54, 56, and 58 corresponding to each time slot. The break indicates additional memory words.

As illustrated in the embodiment shown, the clock input on line 40 accesses the memory words in time sequential order. Each memory word specifies the input that is to be sampled. The memory word is used to activiate the appropriate AND gate to route the desired input sample to the common output 36.

The input control 42 supplies words to the memory upon command and in the particular slot desired according to a slot address. The decoding is such that when the clock signal on 40 actuates the first word 52, as shown, the second gate 30 will be actuated. During the next clock time the last gate 34 will be actuated and during the third time period the first gate 28 will be actuated. In this manner the information contained on lines 1 through *n* at the input of the sample and hold unit 10 will appear in the time slots as shown above output lead 36 with the most recent time in the left. Such a presentation of information in the various time slots follows the order of the words loaded in the memory unit 38. If there is no word loaded in a particular slot such as 56, then there will be no switched information in that time slot on output lead 36 but the time slot will still exist.

To the right of the circuit of FIG. 1 there is a triangular object with a plurality of input leads and a single output lead with a control input. This is intended to illustrate the equivalent presentation of the material on the left. This will be used later in FIG. 3. Basically this just illustrates that the device takes a plurality of parallel inputs and combines the information thereon in serial format output on a single line in accordance with a control input and may be designated as a concentrator.

It should be noted that the sample and hold unit 10 is only necessary with digital input information on the incoming lines. If the input information is analog, the sampling can be accomplished by the gates 28–34. Thus, the use of the present idea with analog information provides a further simplification in equipment.

With analog devices, the lines from the input to the corresponding output of sample and hold 10 can merely be short-circuited or wires connected directly across.

Figure 2:
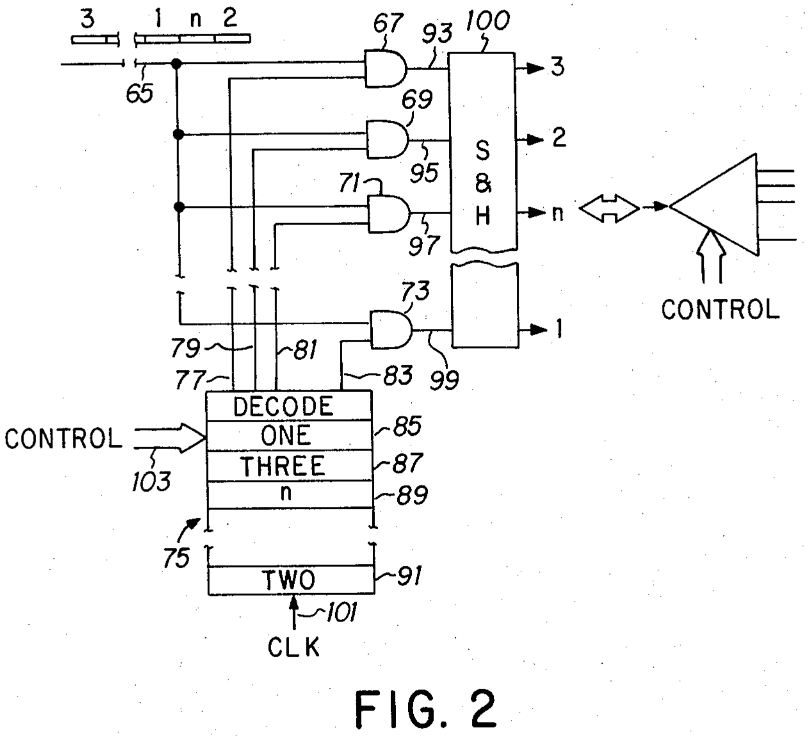
FIG. 2 is a detailed block schematic diagram of a controlled demultiplexer.

In FIG. 2, a line 65 is shown connected to the inputs of each of four AND gates 67, 69, 71, and 73. The break in the lines between gates 71 and 73 indicates a plurality of additional gates may be inserted as discussed in FIG. 1. A control unit, memory unit, register, or decoding means indicated as 75 and identical to the control unit 38 in FIG. 1 is connected to supply a plurality of outputs on leads 77, 79, 81, and 83 to gates 67–73 respectively as shown. Control unit 75 has memory words 85, 87, 89 and 91 as indicated. These memory words specify the routing of the input information to the various output gates. The outputs of the gates 67–73 are labeled respectively 93, 95, 97, and 99 and are applied to a sample an hold circuit 100 for increasing the length of pulses applied thereto. The control unit 75 contains a clock input 101 and a control input 103.

The control units 38 and 75 and their input controls 42 and 103 may be similar to corresponding line assignment devices on other systems such as the Bell Telephone Laboratory's ESS-4. Thus, detailed information on the structure thereof is not herein included. Also, the sample and hold circuit 100 of necessity needs to be coordinated in operation with the decoder 75. This coordination may be by clock 101 (not shown) or other means obvious to those skilled in the art.

On the right hand side of FIG. 2 is a triangle with a single input lead and a plurality of output leads and further having a control input. This is again the equivalent of the circuit diagram on the left hand side of FIG. 2. This diagram represents a time division demultiplexer.

Figures 3, 4:
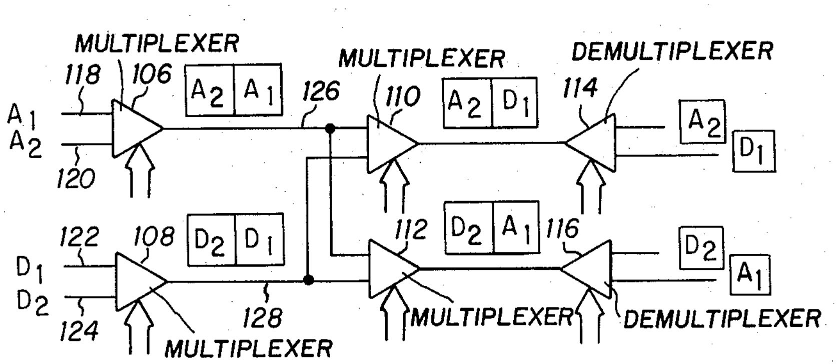
FIG. 3 is a partial schematic block diagram of a switching system utilizing a multiplicity of input multiplexers, output demultiplexers and an intermediate level of switching.
FIG. 4 is a chart for use in explaining the operation of FIG. 3.

FIG. 3 illustrates a plurality of time division multiplexers 106, 108, 110, and 112 along with two demultiplexers 114 and 116. Multiplexer 106 has inputs 118 and 120 labeled 1 and 2 respectively while multiplexer 108 has inputs 122 and 124 labeled 3 and 4, respectively. The output of 106 is connected to inputs of intermediate multiplexers 110 and 112 via a lead 126 while 108 is connected to further inputs of multiplexers 110 and 112 via a lead 128. Multiplexer 110 is further identified as multiplexer A or multiplexer in Channel A while multiplexer 112 is multiplexer B or a multiplexer in channel B. The output of unit 110 is connected to an input of a demultiplexer 114 having a plurality of outputs. The output of multiplexer 112 is connected to demultiplexer 116 also containing a plurality of outputs. Each of the multiplexers and demultiplexers 106–116 contains a control input which would normally be supplying different control signals for each of the devices 106–116 and all multiplexers and demultiplexers are synchronized to the same clock.

During operation the input multiplexers, intermediate multiplexers and output multiplexers are selected to route one of the inputs from each input multiplexer to one of the outputs of each demultiplexer for each time slot.

The minimum number of time slots required is equal to the number of inputs to each input multiplexer. Blocking (inability to connect an input to an available output) can occur in the network under this condition if it is assumed that the existing connections cannot be broken down and assigned new time slots. The blocking condition can be eliminated by providing additional time slots. The network becomes non-blocking if the number of time slots equal: 2 (number of inputs to each input multiplexer) −1.

It is to be noted that the intermediate multiplexers can be replaced with intermediate demultiplexers resulting in the same performance.

FIg. 4 is a chart having a plurality of time slots 1–8 constituting a frame and a plurality of channels of which channels A and B are of interest. Channel A represents the channel including demultiplexer 110 while channel B designates a channel including multiplexer 112 of FIG. 3. A plurality of N's in the diagram indicates that these specific time slots in these channels are busy with other messages and it is desired to transmit a message from time slot 2 in channel A to time slot 4 in channel B.

TDM MULTIPLEXER

FIG. 1

It may be assumed for the purposes of this discussion that synchronization problems of all the digital logic values signals being applied on leads 12–18 have been taken care of so that all of the leads are in their proper logic value at a given particular time as signified by the clock 40. This clock 40 as applied to memory unit 38 would also be applied (possibly in a delayed or advanced version) to sample and hold 10. The sample and hold would then hold the indicated logic value as sampled during the switching operation necessary to multiplex all the signals into a TDM format. As previously implied, after the sample has been completed, the holding action of the unit 10 will provide the desired logic values on the output leads 20–26. Then, the various gates 28–34 are actuated in the order outlined in control unit 38 to produce the output sample as shown adjacent output lead 36. As illustrated, the farthest right portion of the time period illustration is the first occurring in time with the remainder occurring later in time. The control unit is programmed such that gate 30 is the first to be actuated and thus the contents of line 14 are the first to be supplied to output 36. Then, gate 34 is actuated and the contents of lead 18 are supplied. Finally, at the end of the time multiplexed frame, gate 32 is actuated and the contents of lead 16 are supplied to output 36.

The input control 42 can at any time under the influence of a computer or other program changing device alter the particular gate to be selected at a particular time. In accordance therewith, the selection of gates can be interchanged such as altering the designations in slots 54 would cause the selection of gate 28 rather than gate 34.

As also indicated previously, the apparatus of FIG. 1 will operate satisfactorily for analog signals without the requirement for a unit such as sample and hold device 10. In this instance the sampling process would merely have to be of a high enough frequency to pass all necessary information. Of course, the sampled values would in some switching operations have to be transferred to digital value representations but at least the sampled values would be in the selected order and a single analog to digital converter could be used in the line 36 rather than the N plurality of analog to digital converters as would normally be required.

DEMULTIPLEXING APPARATUS

FIG. 2

For purposes of simplicity, the same time slot information organization is used as the input to FIG. 2 as was output on lead 36 of FIG. 1. It will be noted by the designations adjacent output leads 93–99 that the output order is altered again from either that supplied to FIG. 2 or FIG. 1. As illustrated, the control unit 75 selects gate 1 to receive the first time slot information and gate 71 to receive the information in the second time slot. Likewise, gate 73 receives the information in the third time slot. The control format is substantially identical to that of FIG. 1 and further discussion thereon is believed unnecessary.

As will be realized by those skilled in the art, the control units 38 and 75 may merely be the coding devices which will accept a numerical value input at control 103 and at the time of the clock presented on 101 will select an output lead such as 77–83 in accordance with the numerical value of the input on control 103. Thus, the units 38 and 75 in this case would merely be a decoding matrix. Basically, when a memory is used such as shown in 75, a decoding output is still necessary in conjunction therewith to provide the selection process illustrated but the control signal is only required when an alteration of the multiplexing order is required.

THREE-STAGE SWITCHING

FIG. 3

In discussing FIG. 3 it will be assumed that the switching circuit is a very simple one comprising only two time slots per time division multiplex frame. Although the time slots 1 and 2 may correspond to the information contained on leads 118 and 120, the opposite may very well occur depending on the information on the control input for 106. The same applies for the remaining multiplexers and demultiplexers and their specific control inputs. However, the point to be observed is that after the multiplexing occurs in the multiplexers 106 and 108, the information in the time slots shown may be applied to either of the demultiplexers 114 or 116. As an example, the information in time slot 1 on lead 126 may appear in time slot 5 or the first time slot applied to demultiplexer 114 if multiplexer 110 is actuated to pass the information on lead 126 at this first time slot time period. If both multiplexers 110 and 112 are actuated to pass the information on lead 126, both time slots 5 and 7 will contain the information from time slot 1. In most instances, however, the multiplexer 112 will pass different information than that passed by multiplexer 110 and thus, if multiplexer 110 passed the information on lead 126, normally, if multiplexer 112 passed any information at all in a two-channel system, it would pass the information in time slot 3 on lead 128 to be in time slot 7 as applied to demultiplexer 116. As will readily be apparent, this action could be interchanged via the controls applied to multiplexers 110 and 112 such that the information in time slot 5 would be that received from time slot 3 and the information in time slot 7 would be that received from time slot 1.

Using the same method of operation, it can be readily apparent that the information in time slot 2 can be switched to occur in either time slot 6 or 8 or both while the information in time slot 4 can also be applied to either time slots 6 or 8.

If the above now be re-examined, it will become apparent that while multiplexers 110 and 112 as connected to multiplexers 106 and 108 and to demultiplexers 114 and 116, can change the channel in which information is traversing but cannot change the actual time of occurrence. If the chronological order of inputs to the multiplexers 106 and 108 were considered to be a time oriented order, these multiplexers would have the ability to change the effective time of application of a signal to the output thereof. Likewise, if the outputs of demultiplexers 114 and 116 be considered to have time significance as compared to their chronological connection, these devices also provide a time switching function. In this respect, the device shown provides time switching in the first and last stages and provides space switching in the intermediate stage. By definition in this application, time switching is the alteration in a given channel of a piece of information from one time period in a frame to a different time period. Further, by definition the term space switching is the possible transposition of a piece of information in a given time slot in a frame from one channel to another channel.

Thus, data is transferred through the switch by establishing a momentary data path between the input and the output. As an example, during time slot 2 there is a momentary data path from line 118 to the corresponding output of demultiplexer 116. Simultaneously, there is a further momentary data path from line 122 to the corresponding output of demultiplexer 114. There is no character storage in the switch of FIG. 3 other than that provided by the buffer or sample and hold circuits as illustrated by 10 and 100 in FIGS. 1 and 2, respectively.

FIG. 4

FIG. 4 illustrates a system whereby it is assumed that there are four channels and that each channel contains eight inputs. Thus, a frame of information contains eight time slots and it may be desired to alter the information from the second time slot (or lead) of the first channel to the fourth time slot (or lead) of the third channel. It will be apparent that if a conventional multiplexer or demultiplexer were utilized having only time address clocking whereby the information on the first lead always appear on the first time slot of the frame, that the proposed switching could not be accomplished without two additional storage registers per channel. One of these would be at the output of each of the multiplexers and one would be at the input of each of the demultiplexers. For convenience, the two channels shown in FIG. 3 will be utilized as the two channels A and B of FIG. 4 and it will be assumed that the rest of the channels are merely not illustrated. Thus, the information is supplied on lead 2 of the multiplexer 106. As may be observed from the chart, the desired time slot 4 for channel A is already occupied by other information. Thus, the device supplying control signals must search the contents of channels A and B to find a common unoccupied time slot. As shown, it will be observed that time slot 6 on both channels are unoccupied and thus the second lead is not actuated to supply the information to output 126 until time slot 6. At the same time that the second lead of multiplexer 106 is actuated, the lead of channel B multiplexer 112 which is connected to the output of 106 is actuated to pass this same information during time slot 6 to the output thereof and thus to demultiplexer 116. At this same time demultiplexer 116 also actuates an output lead. However, during this time slot 6 it actuates output lead 4. Thus, while each of the multiplexers 106 and 112 as well as demultiplexer 116 are actuated simultaneous in time, the effect is the same as a time transfer, a space transfer, and a further time transfer.

As may be observed from the above description of a preferred embodiment of the invention, the present concept involves a simplification of switching functions and greatly simplifies the operation of a three-stage switch in an effective time-space-time configuration even though the informatin is passed directly and substantially simultaneously from input to output thereof. Since other improvements and modifications will be apparent to those skilled in the art, I wish to be limited not by the embodiment shown but only by the scope of the appended claims.

I claim:

1. Time division apparatus for use in providing switching action of signals between various circuit paths comprising, in combination:

a first plurality of time division multiplexing means each having a plurality of signal inputs which are sampled and selectively applied to an output thereof on a repetitive basis the sequence of which varies in accordance with and as a function of a control input to each of said time division multiplexing means;

a second plurality of time division multiplexing means each having a plurality of input means, and output means and a control input, the second plurality of multiplexing means each providing a time division multiplexed output signal representative of sampled values of input signals supplied thereto on a repetitive basis in accordance with control signals supplied at said control input thereof and the sequence of sampling and therefore of the signals appearing at said output varying in accordance with the control signals supplied thereto;

a plurality of demultiplexing means each comprising a single serial information signal input and a plurality of outputs and a control input, each of said plurality of demultiplexing means connecting the output means thereof to the signal input means in an order determined by signals being supplied on said control input thereof and the order changing in accordance with the control signal supplied at the input thereof; and means connecting said second plurality of multiplexing means between said first plurality of multiplexing means and said plurality of demultiplexing means whereby the input means of each of said plurality of second multiplexing means are connected to the outputs of at least two of the multiplexing means of said first plurality and the output means of each of said multiplexing means of said second plurality is connected to a corresponding signal input of one of the demultiplexing means of said plurality of demultiplexing means, the connection providing a total switch apparatus performing a time-space-time switching function.

2. Apparatus as claimed in claim 1 in addition:

a plurality of sample and hold circuits connected to a plurality of digital logic signal supplying means for sampling the logic values thereof at a given time and providing outputs to each of said first plurality of time division multiplexing circuits.

* * * * *